(12) United States Patent
Tan

(10) Patent No.: US 8,456,655 B2
(45) Date of Patent: Jun. 4, 2013

(54) USER IDENTIFICATION FOR SCANNING APPARATUS

(75) Inventor: Siow Kiat Tan, Singapore (SG)

(73) Assignee: Eastman Kodak Company, Rochester, NY (US)

( * ) Notice: Subject to any disclaimer, the term of this patent is extended or adjusted under 35 U.S.C. 154(b) by 345 days.

(21) Appl. No.: 12/966,153

(22) Filed: Dec. 13, 2010

(65) Prior Publication Data

US 2012/0147402 A1 Jun. 14, 2012

(51) Int. Cl.
*G06F 3/12* (2006.01)

(52) U.S. Cl.
USPC .......................... 358/1.13; 382/124; 340/583

(58) Field of Classification Search
None
See application file for complete search history.

(56) References Cited

U.S. PATENT DOCUMENTS

| 6,883,709 | B2 | 4/2005 | Joseph |
| 7,263,212 | B2 | 8/2007 | Kawabe |
| 2003/0012415 | A1* | 1/2003 | Cossel .......................... 382/124 |
| 2003/0055876 | A1 | 3/2003 | Korala et al. |
| 2007/0013986 | A1 | 1/2007 | Gutierrez et al. |

* cited by examiner

*Primary Examiner* — Marivelisse Santiago Cordero
*Assistant Examiner* — Aaron R Gerger
(74) *Attorney, Agent, or Firm* — Peyton C. Watkins

(57) ABSTRACT

A scanning apparatus includes a transparent platen on which an item can be placed for scanning; a light source configured to emit light through the transparent platen to reflect off the item; a photosensor array that is movable to receive light reflected from successive portions of the item and convert the reflected light into electrical signals; a controller for providing digitized data from the electrical signals to form a digitized image of the item; and a lid including a first position such that the lid covers the transparent platen; a second position such that the lid does not cover the transparent platen; and a door that is configured to expose a portion of the transparent platen when the lid is in the first position.

20 Claims, 8 Drawing Sheets

USER IDENTIFICATION FOR SCANNING APPARATUS

CROSS REFERENCE TO RELATED APPLICATIONS

Reference is made to commonly assigned, co-pending U.S. patent application Ser. No. 12/966,169, filed concurrently herewith, entitled: "Method of Identifying User of Scanning Apparatus", the disclosure of which is incorporated herein.

FIELD OF THE INVENTION

The present invention relates to the identification of a user of a scanning apparatus, whether as a separate scanning apparatus or as part of a copier, multifunction printer, or other such apparatus.

BACKGROUND OF THE INVENTION

Optical scanners operate by imaging an object (e.g. a document) with a light source, and sensing a resultant light signal with an optical sensor array. Each optical sensor or photoreceptor in the array generates a data signal representative of the intensity of light impinged thereon for a corresponding portion of the imaged object. The data signals from the array sensors are then processed (typically digitized) and stored in a temporary memory such as a semiconductor memory or on a hard disk of a computer, for example, for subsequent manipulation and printing or display, such as on a computer monitor. The image of the scanned object is projected onto the optical photosensor array incrementally by use of a moving scan line. The moving scan line is produced either by moving the document with respect to a scanner optical assembly, or by moving the scanner optical assembly relative to the document. Either or both of these methods may be embodied in a flat bed scanner, multi-function printer, or any scanner having manual and automatic feed capabilities.

Various types of photosensor devices may be used in optical scanners. For example, a commonly used photosensor device is the charge coupled device (CCD). A CCD builds up an electrical charge in response to exposure to light. The size of the electrical charge build up is dependent on the intensity and the duration of the light exposure. In optical scanners, CCD cells are aligned in a linear array. The length of the linear array is typically somewhat less than the length or width of the document scanning region. Each photoreceptor of the CCD has a portion of a scan line image impinged thereon as the scan line sweeps across the scanned object. The charge built up in each of the pixels is measured and discharged at regular "sampling intervals." In most modern optical scanners, the sampling intervals of the CCD arrays are fixed.

An image of a scan line portion of a document is projected onto the scanner's linear photosensor array by scanner optics. In such CCD scanners, the scanner optics include an imaging lens which typically reduces considerably the size of the projected image from its original size. The scanner optics provide good depth of field in a CCD scanner. However, because the photoreceptors are so small in the CCD device, a fairly strong light source such as a fluorescent lamp is needed to illuminate the scan line image region of the document in order to provide sufficient signal strength at each photoreceptor site.

A second type of scanner is the contact image sensor (CIS) scanner. A CIS scanner includes a contact image sensor having a length that is substantially equal to the width of the scanning region. The photoreceptors in a CIS are substantially the same size as the pixel resolution of the scanner. Because the photoreceptors in the CIS are so much larger than they are in a CCD, a lower power light source (such as one or more LED's) is sufficient to provide enough illumination in the scan line image region. The CIS has a short depth of field and is typically mounted beneath the transparent platen upon which the document is placed. One or more rollers in the CIS carriage are biased against the bottom of the transparent platen so that the CIS is always at substantially the same distance from the top of the transparent platen.

Photoreceptors in a CCD or CIS scanner linear photosensor array are aligned in a "cross" direction, i.e., a direction parallel to the longitudinal axis of the scan line image which is projected thereon. The direction perpendicular to the "cross" direction will be referred to herein as the "scan" direction (i.e., paper or sensor linear array movement direction for scanning of the image).

At any instant when an object is being scanned, each photoreceptor in the photosensor array has a corresponding area on the object which is being imaged thereon. This corresponding area on the scanned object is referred to herein as a pixel. An area on a scanned object corresponding to the entire extent of the linear photosensor array is referred to herein as a scan line. For descriptive purposes, a scanned object is considered to have a series of fixed adjacently positioned scan lines. Further, scanners are typically operated at a scan line sweep rate such that one scan line width is traversed during each sampling interval.

In addition, when working with cut sheet print media, a copying, scanning or multifunction printing apparatus may provide automatic document feed, as well as manual document placement capabilities. An automatic document feeder (ADF) mechanism is capable of automatically loading and unloading single sheets sequentially to a functional station where the apparatus performs an operation, e.g., sequentially scanning the fed document sheets for copying, faxing, displaying on a computer monitor, or the like. Following the operation, the ADF then off-loads a sheet and feeds the immediately following sheet of the document to the functional station. A sequential flow of sheets by the ADF and positioning without the necessity of manual handling reduces the time required to accomplish the complete functional operation. An ADF may be designed to scan single-sided originals or two-sided originals.

Each document fed into the ADF is conveyed to an automatic scanning region where the document is scanned by an image sensor and then the document is conveyed to a point outside the ADF, such as a document output tray. During ADF operation, the image sensor remains fixed at the automatic scanning region "reading" or scanning the image as the document is conveyed past the scanning point by the ADF. During manual scanning, the document lays flat on and covers a portion of the flat platen while the image scanner is moved under the platen the length (or width) of the document to read or scan the document. In many flatbed scanners, the scanning point or portion of the flat platen used to scan a document provided by the ADF is separate and distinct from the portion of the flat platen utilized to scan a document manually positioned on the plate.

Scanners also typically include a lid that covers the transparent platen. In manual document placement operation, the lid is lifted so that the user can place the document on the transparent platen and align it properly. The lid is then closed prior to scanning. For scanners that have an ADF, the bottom of the ADF can function as the lid that covers the transparent platen.

Many scanners or multifunction printers, whether in a home, office, or other public environment, have multiple users, and can optionally be networked. Such a scanner or multifunction printer can store user-preferred default settings, or user-confidential information in its non-volatile storage, e.g. email profiles (username, passwords, and contacts). For a walk-up user who wishes to retrieve user-specific information or settings, the scanner or multifunction printer typically requires the user to login with a password or personal identification number code. However, this requires users to remember yet one more password or PIN number. An alternative is to use biometric scanners such as a thumb scanner or voice recognition to identify the user. However, this would require additional components and hardware costs.

What is needed is a reliable and easy-to-use way to identify users of scanners or multifunction printers without adding significant cost.

SUMMARY OF THE INVENTION

The present invention is directed to overcoming one or more of the problems set forth above. Briefly summarized, according to one aspect of the invention, the invention resides in a scanning apparatus comprising a transparent platen on which an item can be placed for scanning; a light source configured to emit light through the transparent platen to reflect off the item; a photosensor array that is movable to receive light reflected from successive portions of the item and convert the reflected light into electrical signals; a controller for providing digitized data from the electrical signals to form a digitized image of the item; and a lid including a first position such that the lid covers the transparent platen; a second position such that the lid does not cover the transparent platen; and a door that is configured to expose a portion of the transparent platen when the lid is in the first position.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Figure 1:
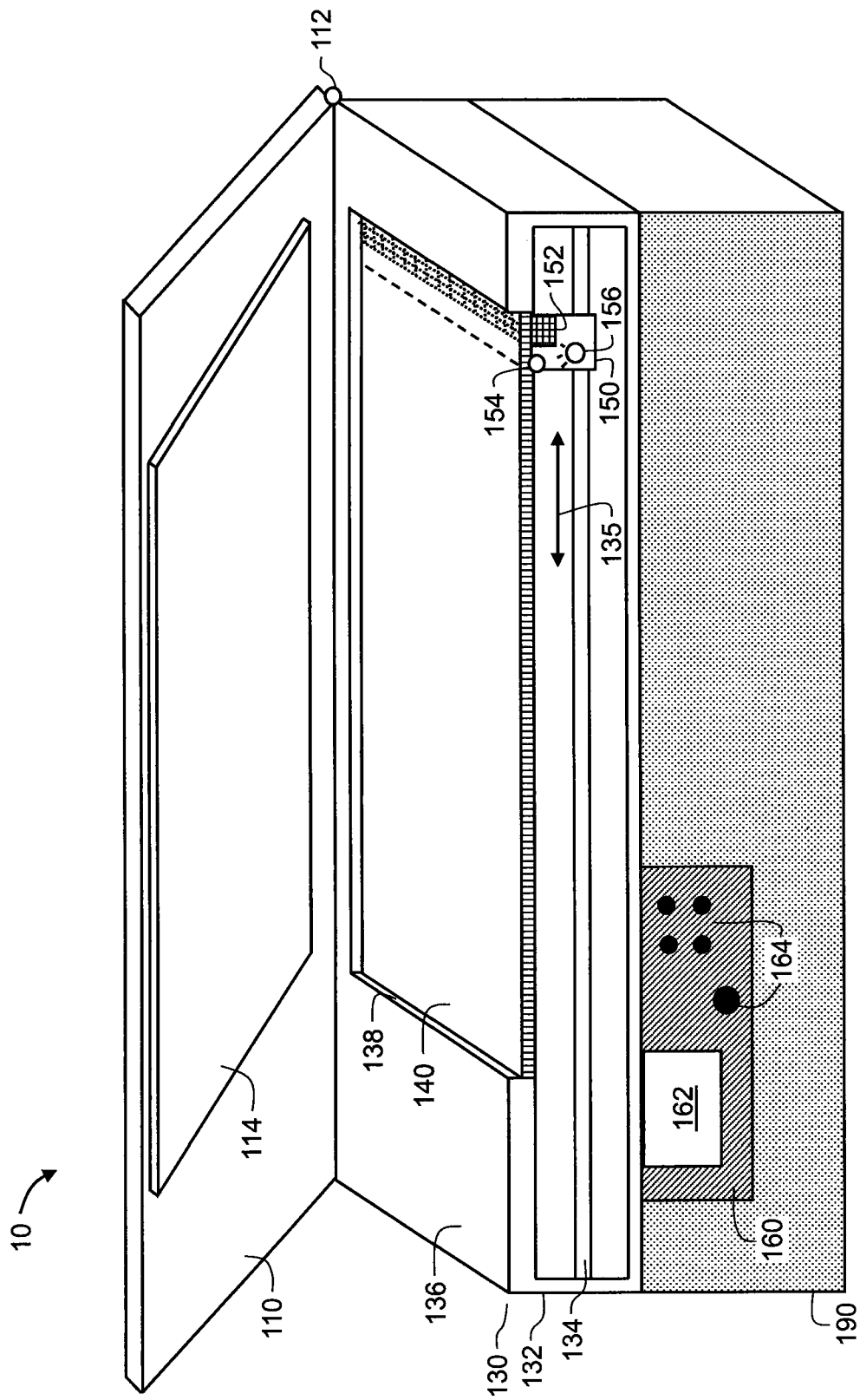
FIG. 1 is a perspective view of a prior art multifunction printer.

FIG. 1 shows a perspective view of a prior art multifunction printer 10 including a scanning apparatus 130 and a printing apparatus 190. In this view, the front portion of scanning apparatus 130 is cut away in order to show internal features of the scanning apparatus more clearly. Multifunction printer 10 can do printing, scanning of documents, or copying of documents (i.e. printing plus scanning).

Control panel 160 for the apparatus is shown in FIG. 1 as being located on the front of printing apparatus 190, but this was done partly for illustrative purposes so as not to obscure features of the scanning apparatus 130. Control panel 160 could alternatively be located on the scanning apparatus 130. Control panel 160 can include display 162 and a variety of control buttons 164, which can include a Start button. For cases where display 162 is a touch screen, control buttons 164 can be integrated into the touch screen rather than being separate from it. Control panel 160 can also be detachable from the apparatus, for example as a tablet. Control panel 160 can be a virtual front panel software application running on a mobile device, for example a smart phone, communicating to the apparatus wirelessly or by wired connection.

Scanning apparatus 130 includes scanning apparatus body 132 and scanner lid 110, which is joined to scanning apparatus body 132 by hinge 112. The surface of scanning apparatus body 132 that is covered by scanner lid 110 when scanner lid 110 is closed includes a frame 136. Transparent platen 140 (typically a flat piece of glass) is inset within the frame 136. In the example shown in FIG. 1, the surface of the transparent platen 140 is lower than the surface of frame 136 so that there is an offset 138. Transparent platen 140 is not covered by scanner lid 110 when the scanner lid is open as it is in FIG. 1.

Below transparent platen 140 is movable sensor array module 150. In the example shown in FIG. 1, sensor array module 150 includes a photosensor array (such as a contact image sensor) 152 extending the width of the transparent platen 140, a roller 154 that is biased into contact with the underside of the transparent platen 140, and a light source 156 that illuminates a scan line of a document or other item (not shown) that is placed on top of transparent platen 140. A light guide and other optics (not shown) can also be included in sensor array module 150. Sensor array module 150 is moved back and forth along scanning guide 134 in direction 135 across the length of transparent platen 140 in order to scan the document or other item, receiving reflected light from the item through the transparent platen 140 scan line by scan line and converting the reflected light into electrical signals. A controller (not shown) converts the electrical signals into digitized data to form a digitized image of the item. Scanning guide 134 can be a round rail, a rack and pinion or other guiding member that can use the power of a motor (not shown) to provide a linear motion along the scanning direction 135. In FIG. 1, sensor array module 150 is parked in its home position near one end of the transparent platen 140. The home position is where sensor array module 150 returns between scanning operations.

Scanner lid 110 includes a reflective backing plate 114. The thickness of reflective backing plate 114 is accommodated in offset 138 between frame 136 and the top surface of transparent platen 140 when scanner lid 110 is closed. Reflective backing plate 114 can be resiliently mounted on scanner lid 110, so that reflective backing plate 114 is effective in pressing documents of various thicknesses against transparent platen 140. Typically reflective backing plate 114 is white in the document scanning region. Since many documents are printed on white paper, a white reflective backing plate 114 results in an overall white background, even for documents of sizes that are smaller than the scanning region. For other types of objects to be scanned, such as photos, the white reflective backing plate 114 produces a clean background that provides good contrast for the photos. In other scanning apparatus designs, the reflective backing function is integrated into scanner lid 110.

Figure 2:
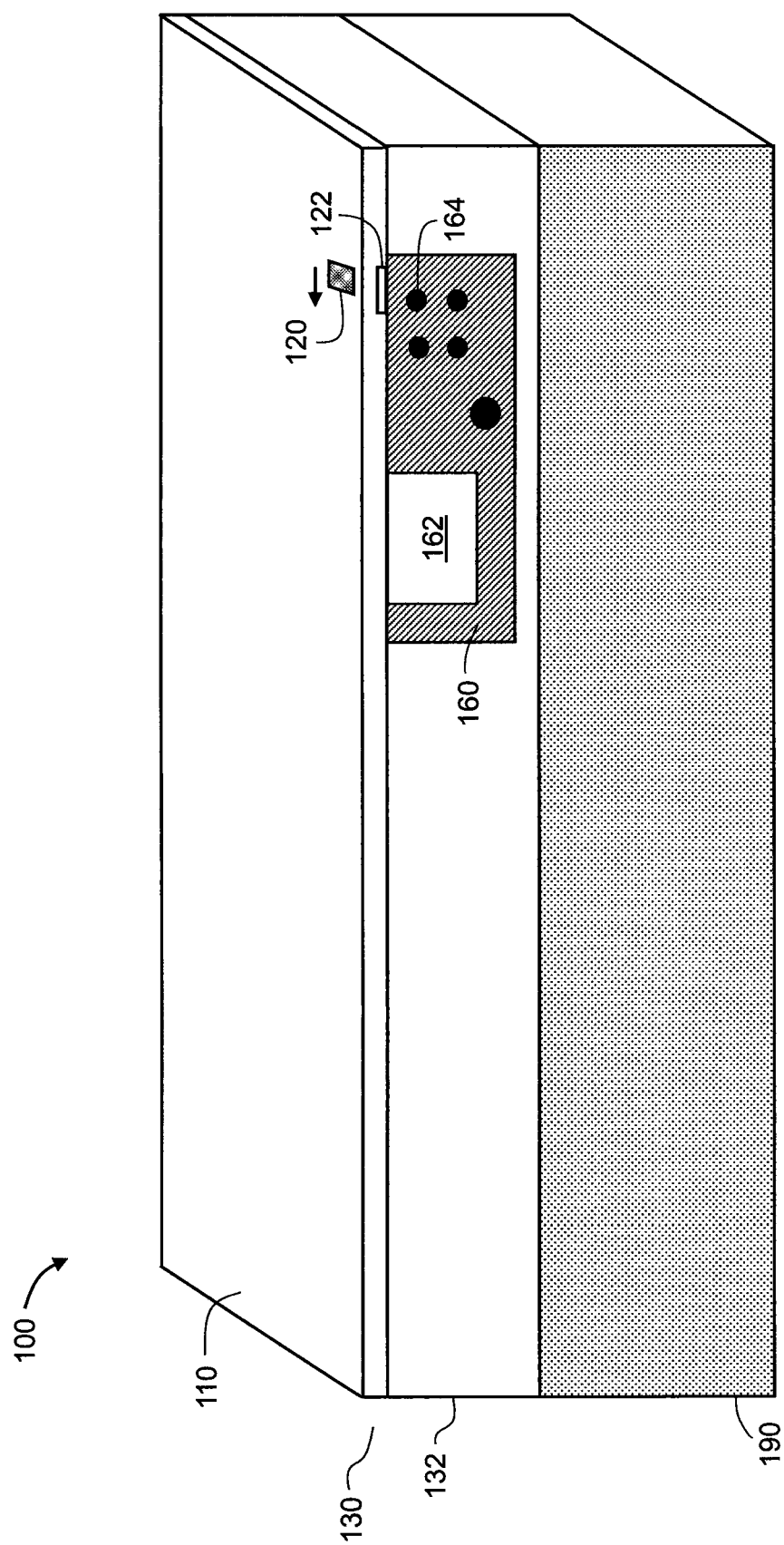
FIG. 2 is a perspective view of a multifunction printer according to an embodiment of the present invention with the scanner lid closed and the door closed.
Figure 3:
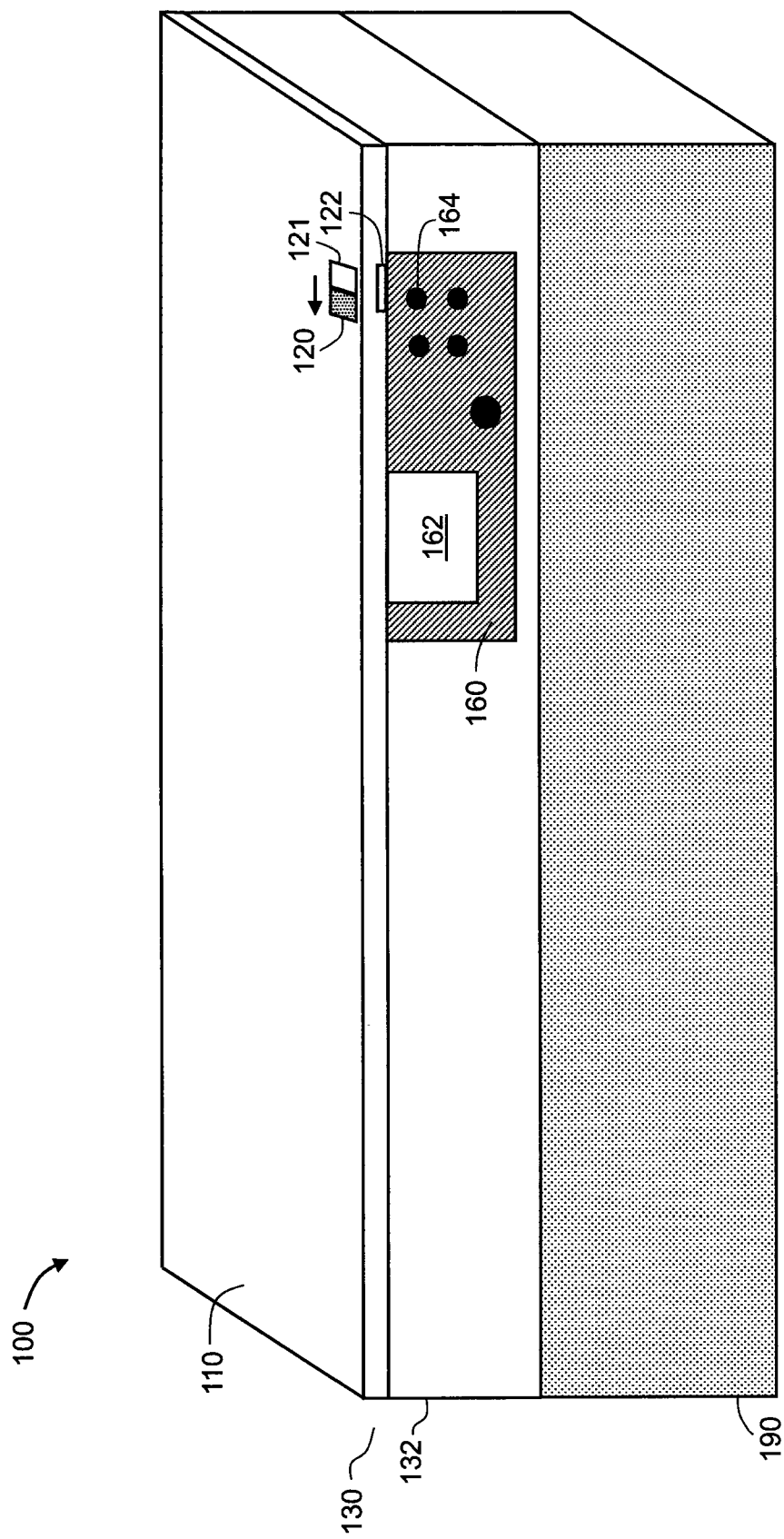
FIG. 3 is similar to FIG. 2, but with the door open.
Figure 4:
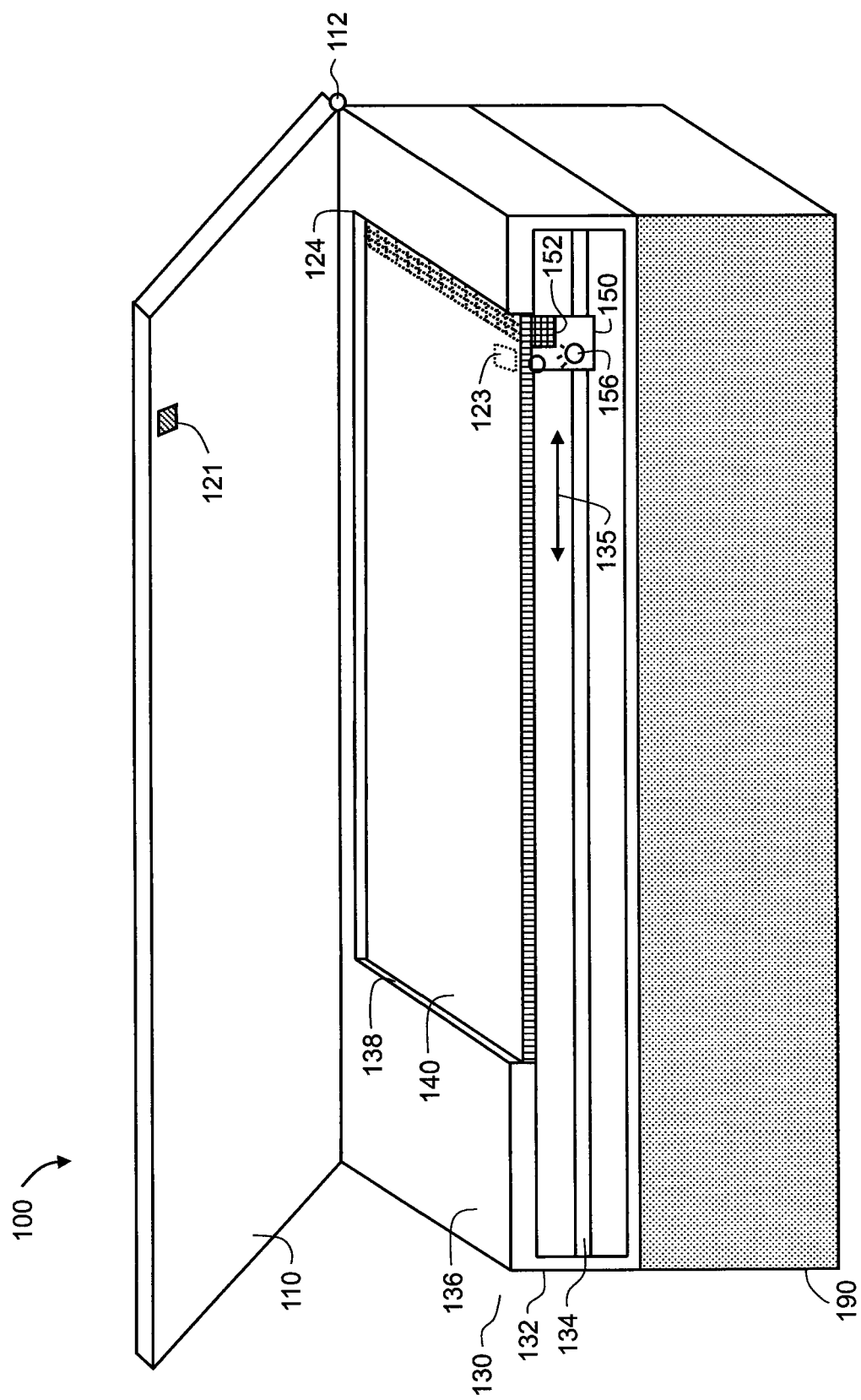
FIG. 4 is similar to FIG. 2, but with the scanner lid open.

FIGS. 2 to 4 are perspective views of a multifunction printer 100 according to an embodiment of the present invention. The primary difference between the embodiment of FIGS. 2 to 4 and the prior art multifunction printer 10 is that a door 120 is included in scanner lid 110. Door 120 is configured to expose a portion 123 (see FIG. 4) of transparent platen 140 when scanner lid 110 is closed (covering transparent platen 140), as it is in FIGS. 2 and 3. In the example shown in FIGS. 2 and 3, door 120 can be opened by sliding it parallel to the surface of scanning lid 110 in the direction of the arrow to reveal a window 121 through which portion 123 of transparent platen 140 is exposed. Window 121 can be an opening through which a finger or thumb can be placed directly on the transparent platen 140 for user identification by scanning when scanner lid 110 is closed. Alternatively, window 121 can include a transparent member, such that the user places his finger or thumb on the transparent member rather than directly on the transparent platen 140, in order to reduce the occurrences of finger prints on the transparent platen 140. In the example shown in FIG. 4, the white reflective backing feature is integrated into scanner lid 110. In such an example, door 120 would have a white reflective underside that is configured to face transparent platen 140.

Types of doors 120 other than the sliding door shown in FIGS. 2 and 3 are also possible. A hinged door (not shown) that pivots open is an alternative way to expose a portion of the transparent platen for placement of a finger or thumb while scanner lid 110 is closed. For the case where the user identifier is an identification card having a coded pattern (such as a bar code or a two dimensional pattern) that can be optically scanned, an access slot door 122 in the side of scanner lid 110 is a suitable type of door to expose a portion of the transparent platen 140 to the identification card when the scanner lid 110 is closed. In such a case, the user inserts the identification card into access slot door 122 while scanner lid 110 is closed in order to optically scan the identification card.

Whether the user places a thumb or finger into a window 121 revealed by opening a door 120 in the top of scanner lid 110, or inserts an identification card into an access slot door 122 in the side of scanner lid 110, the identification sequence can be initiated by the user pressing a button 164 on control panel 160 when the user identifier is in place. Positioning control panel 160 on scanning apparatus 130 near door 120 or access slot door 122, as shown in FIGS. 2 and 3, facilitates pushing the appropriate user identification button 164. The initiation of the identification sequence can be done by pressing a physical button 164 on control panel 160 or a virtual button on a software application. Initiation of user identification can also be voice-activated, light-activated, pressure-activated, or timer-activated after the door is opened.

Figure 5:
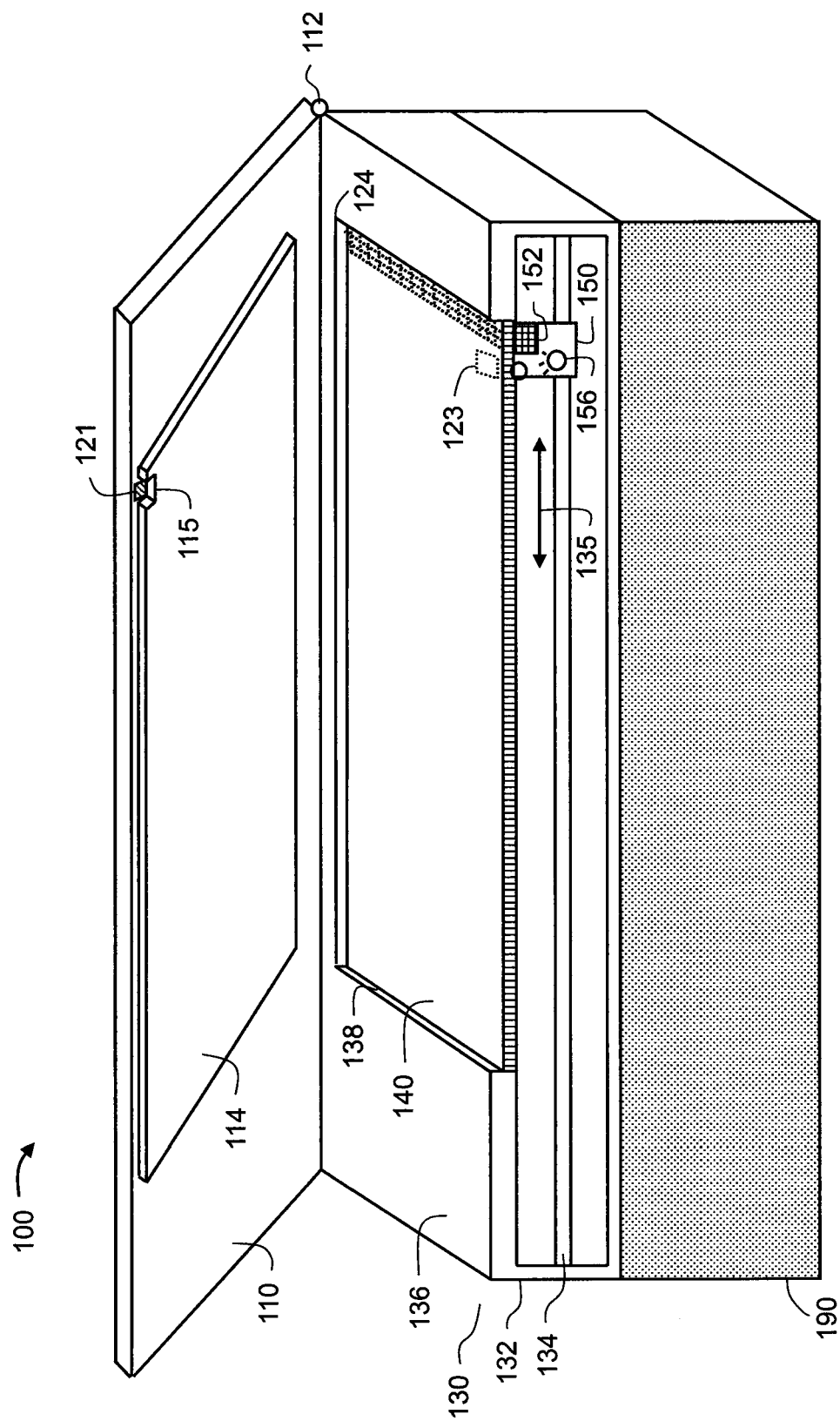
FIG. 5 is a perspective view of a multifunction printer according to an embodiment of the present invention including a reflective backing plate.

FIG. 5 shows a perspective view of an embodiment where reflective backing plate 114 is a separate member from scanner lid 110. In such a case reflective backing plate 114 can have a cutout 115 corresponding to the position of window 121. Optionally in such a case, the door in scanner lid 110 can have a white reflective member that projects into cutout 115 when the door is closed. In such a case, a hinged door may be preferable to a sliding door. Whether the white reflective function is integrated into the bottom of scanner lid 110 (as in FIG. 4), or provided by a reflective backing plate 114, it is beneficial for the door 120 to include a white reflective portion that is configured to face the transparent platen 140. It is also advantageous for the white reflective portion of the door to be complementary in shape to the white reflective portion of the scanner lid 110. For embodiments having an access slot door 122 in the side of scanner lid 110, but not a door 120 on the top of scanner lid 110, a cutout in the reflective backing plate 114 may not be required. Since reflective backing plate 114 is typically resiliently mounted on the bottom of scanner lid 110, if the edge of reflective backing plate 114 facing access slot door 122 is beveled upward toward scanner lid 110, a user identification card inserted into access slot door 122 can displace reflective backing plate 114 upward and out of the way during the step of user identification.

The size of the portion 123 of the transparent platen 140 that is exposed through door 120 or access slot door 122 can be relatively small. It is advantageous for the size of the exposed portion 123 to be the size of a typical finger or thumb (approximately 1 inch by three quarters of an inch) for the case of user identification by scanning a human digit. It may be preferable to oversize the opening in order to accommodate a range of sizes. However, the exposed portion would typically not need to be larger than about 1 to 2 square inches. It is preferable to keep the size of the window 121 small in order to provide a predictable location for the position of the finger or thumb, and to restrict movement of the finger or thumb during scanning for identification. A further advantage of keeping the size of window 121 small is that less light from light source 156 would shine into the user's eyes during user identification. Optionally, not only can door 120 and window 121 be sized to fit a human digit, they can also be shaped to fit a human digit. For embodiments where a user identification card is inserted into access slot door 122, the exposed region 123 can also be on the order of 1 to 3 square inches. Typically, the size of the transparent platen 140 is greater than 100 square inches in order to accommodate both letter-sized paper and A4 paper, so the portion 123 that is exposed to the user identifier has an area that is typically less than three percent of the area of the transparent platen 140.

There are a variety of considerations for positioning door 120 and/or access slot door 122. First of all, since the user typically approaches the scanning apparatus 130 or multifunction printer 100 from the front (as viewed in FIGS. 2 to 5), a position indicated as shown is convenient for inserting the user identifier. Secondly, to reduce the time require for scanning, it is advantageous to position the door 120 and/or access slot door 122 near the home position of sensor array module 150, so that the sensor array module 150 does not need to be moved very far before scanning the user identifier. Because the user identifier is typically small, the entire scanning operation for identification preferably can take less than 5 seconds. Much longer than that could be objectionable to the user. A further consideration is the impact of the presence of door 120 on the quality of image scanning. Even though door 120 includes a white reflective portion that faces the transparent platen 140 and is complementary in shape to the white reflective region of the scanner lid 110, at the boundary between the white reflective portion of the door and the white reflective region of the lid there can be a dark outline or shadow that can impact image quality. Methods are described below for circumventing image quality defects. However, another countermeasure is to position door 120 in a region that is away from critical scanning regions of most documents. Typically, a reference corner is indicated on scanning apparatus 130 for the user to bank a corner of his document against. In FIGS. 4 and 5 a reference corner 124 is designated at a location that is at an opposite end of transparent platen 140 relative to the end where door 120 and exposed portion 123 are located. For smaller documents such as 4"×6" photographs, the outline of door 120 is far away from the document. Even for letter sized documents, the outline of door 120 will be at or beyond the margin of the document being scanned.

Figure 6:
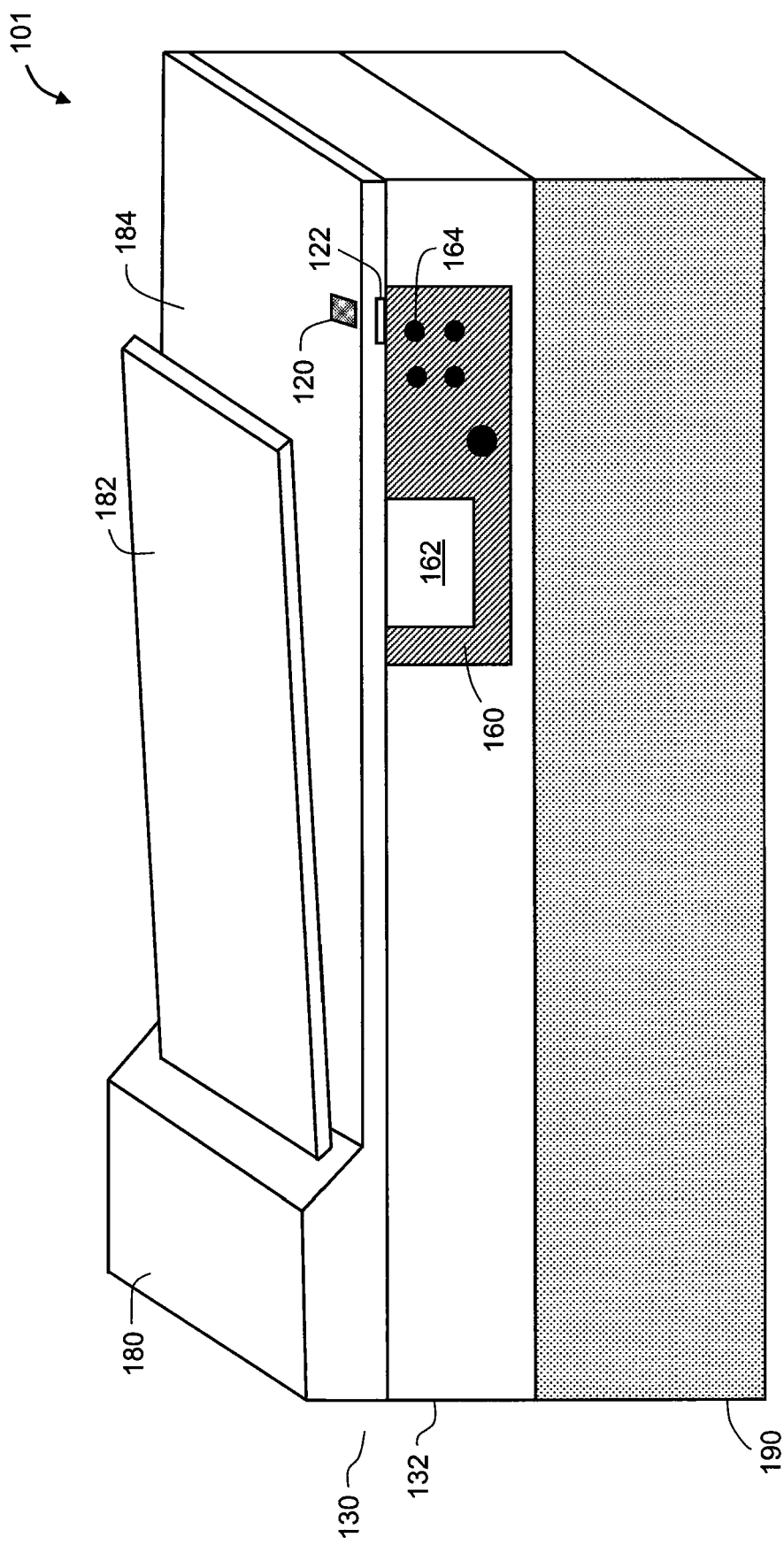
FIG. 6, is a perspective view of a multifunction printer having an automatic document feeder according to an embodiment of the present invention with the ADF lid closed and the door closed.
Figure 7:
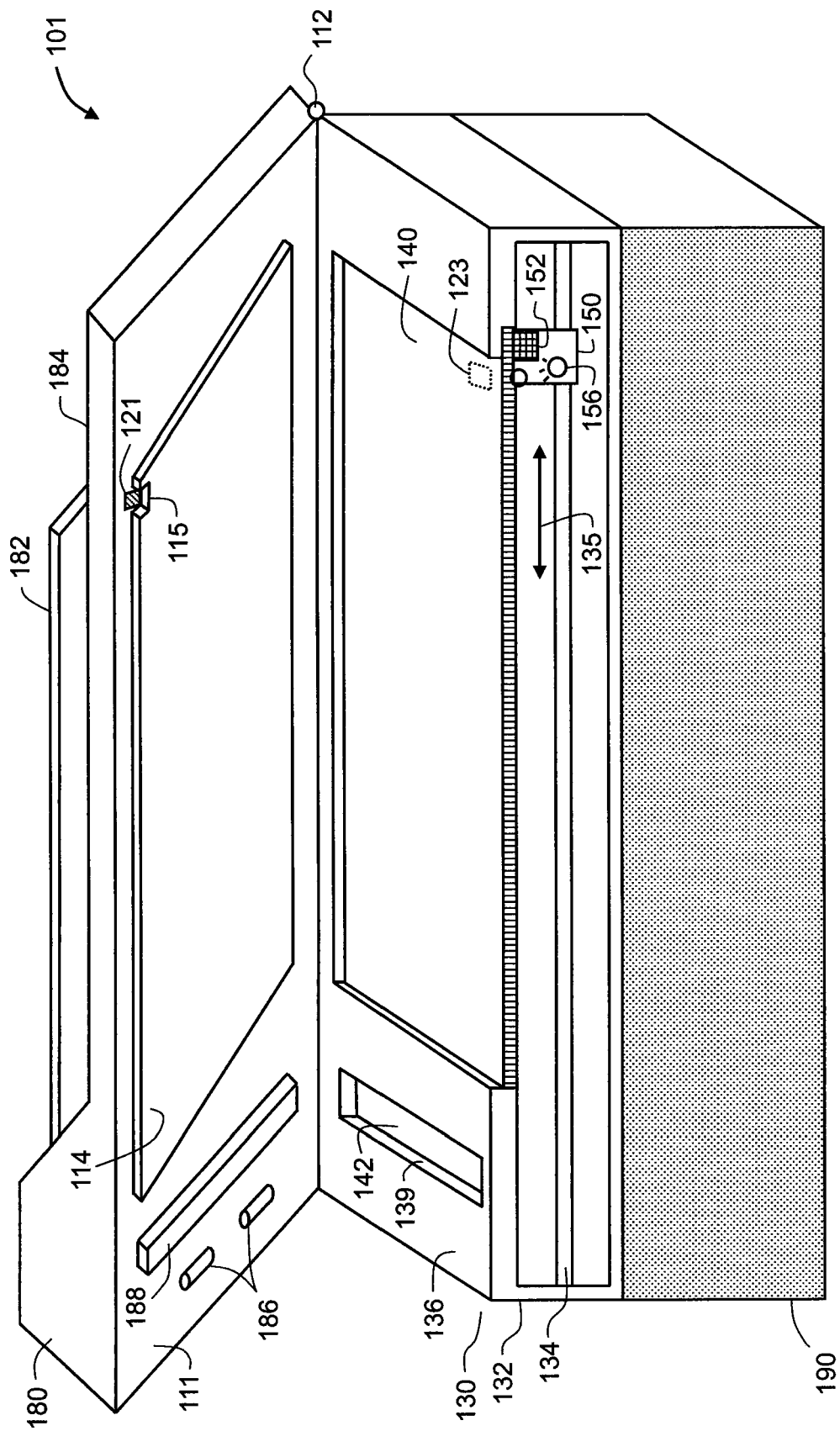
FIG. 7 is similar to FIG. 6, but with the ADF lid open.

For ease in document handling, many scanners, copiers and multifunction printers include an automatic document feeder. FIGS. 6 and 7 show perspective views of a multifunction printer 101, similar to the multifunction printer 100 shown in FIGS. 2 and 5, but also including automatic document feeder (ADF) 180, and other associated modifications. ADF 180 includes an input tray 182 where documents for scanning or copying are stacked, output tray 184 for receiving scanned documents, document feed rollers 186 for moving the documents, and reflective backing strip 188 for providing a white background (similar to the function of reflective backing plate 114). The under side 111 of ADF 180 functions similar to scanner lid 110 and can include a reflective backing plate 114. Opening or closing ADF "lid" 180 is therefore equivalent to opening or closing a scanner lid. In the embodiment shown in FIG. 7, a separate transparent platen region 142 is provided for scanning documents being fed by ADF 180. Frame 136 includes an offset region 139 in which transparent platen region 142 is set, so that offset region 139 can accommodate reflective backing strip 188 when ADF 180 is closed over transparent platen 140. In other embodiments, the region for scanning of documents being fed by ADF 180 can be an extension of the transparent platen 140, in which case a separate transparent platen region 142 and a separate reflective backing strip 188 would not be required. For documents to be scanned using ADF 180, sensor array module 150 is moved to a position below transparent platen region 142 and is held parked in position while ADF 180 feeds documents past it, so that there is still relative motion between the document and the photosensor array 152 and an image can be composed one scan line at a time. As in the previous embodiments shown in FIGS. 2-5, the embodiment of FIGS. 6 and 7 having an ADF 180 also include a door 120 and an access slot door 122 in order to expose a portion 123 of transparent platen 140 when the ADF 180 is closed over the transparent platen 140. It can be advantageous to locate door 120 and/or access slot door 122 at or near an end of transparent platen 140 that is opposite the end where sensor array module 150 is parked below transparent platen region 142 during ADF scanning, in order to conveniently position the user identification access away from the input tray 182 and the ADF unit 180.

Figure 8:
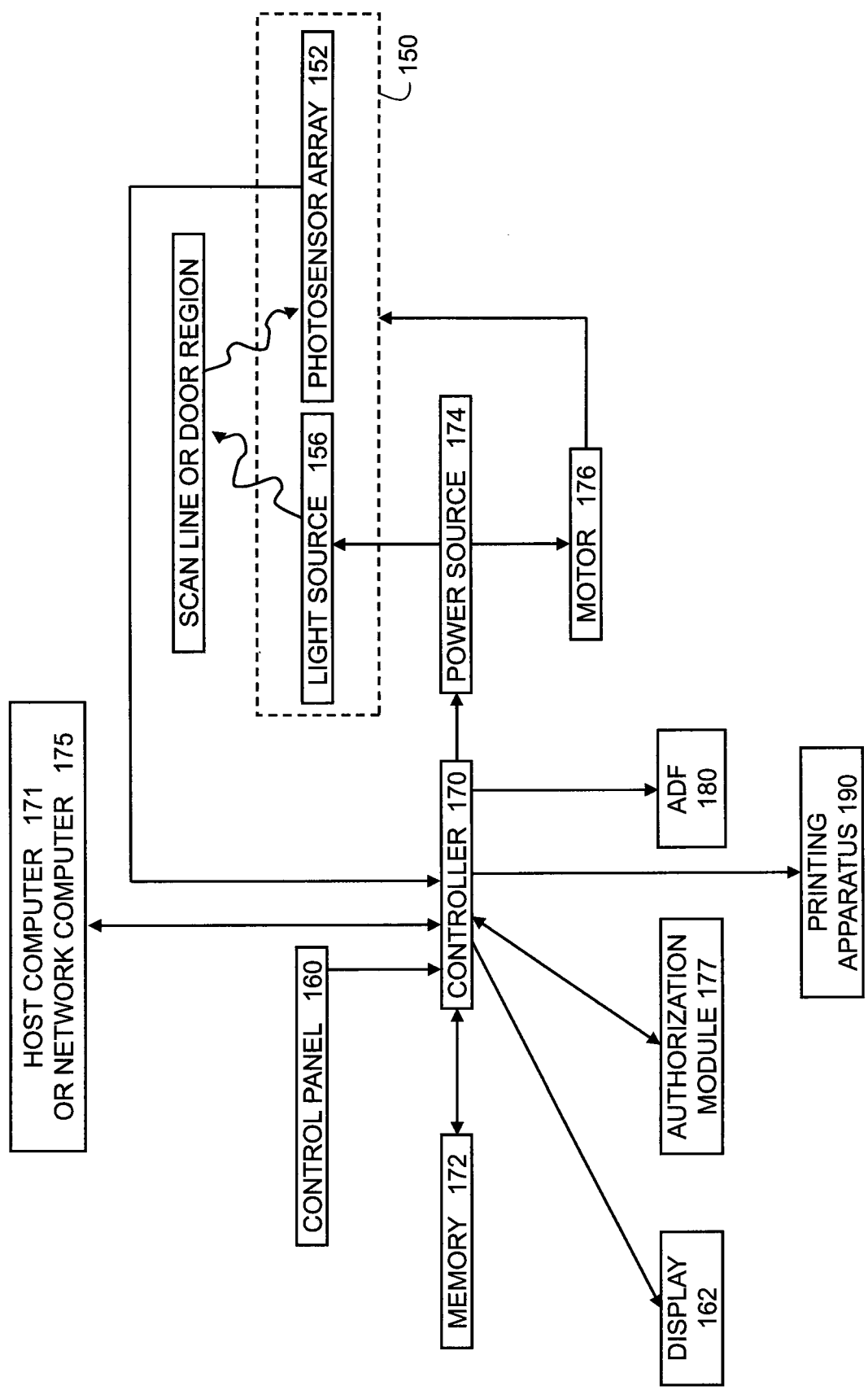
FIG. 8 is a schematic diagram showing how the different parts of the multifunction printer are related to one another and to external computers.

Whether scanning apparatus 130 is a separate unit or is incorporated into a multifunction printer or copier, scanning apparatus 130 will have a controller 170 including hardware and software or firmware. FIG. 8 schematically shows controller 170 and its relationship with other portions of scanning apparatus 130, printing apparatus 190 and associated computers. In normal scanning operation in the active mode of operation, a user can initiate a scanning operation from control panel 160, or alternatively a scanning job can be initiated from host computer 171 or network computer 175 to which the scanning apparatus 130 or multifunction printer 100 is connected. In either case a signal is sent to controller 170, which then sends a signal to power source 174 to turn on light source 156 and also to operate motor 176 in order to move sensor array module 150 along scanning direction 135. As sensor array module 150 is moved, light from light source 156 reflects off a document or other object that is placed on transparent platen 140 (or off the user identifier in the region of door 120 during user identification), and impinges on photosensor array 152 one scan line at a time. A scan line signal is sent from photosensor array 152 to controller 170 where it may be further processed before sending it to memory 172 (or to host computer 171) in order to compose an entire scanned image signal, scan line by scan line. When the scan is completed, controller 170 sends a signal to power source 174 to send power to motor 176 in order to return sensor array module 150 to its home position.

Operation of user identification and function authorization by a scanning apparatus or a multifunction printer including a scanning apparatus according to embodiments of the invention will next be described with reference to FIGS. 2 through 8. The portion 123 of transparent platen 140 is exposed through a door 120 or access slot door 122 in scanner lid 110 or in ADF 180. A user identifier, such as a human digit or an identification card, is placed into the door 120 after opening it, or is placed into access slot door 122 by inserting the user identifier. A user identification initiation signal is provided, for example by pressing a button 164 on control panel 160. Alternatively, there is a sensor (not shown) that detects when door 120 has been opened or when an identification card has been inserted into access slot door 122, and the sensor sends the user identification initiation signal. Light is then emitted from light source 156 to illuminate the exposed portion 123 of the transparent platen 140. If necessary, light source 156 is moved into position near exposed portion 122. Photosensor array 152 is moved to scan the user identifier through the exposed portion 123 of the transparent platen 140. During this step it is only necessary to move the photosensor array 152 across the exposed portion 123, not across the entire transparent platen 140. It is also only necessary to process signals from the part of the photosensor array 152 that cross the exposed portion 123 during scanning, rather than processing signals from the entire photosensor array 152. As a result, scanning of the user identifier can be done relatively quickly. The image of the user identifier is digitized by controller 170. The digitized image is compared to patterns that are stored in nonvolatile memory 172. A predetermined function of the scanning apparatus or multifunction printer is then authorized by authorization module 177 (typically in firmware) if it is determined that the digitized image of the user identifier adequately matches one of the stored patterns in memory 172. The particular function that is authorized can depend upon which stored pattern is matched.

As indicated above, in some embodiments, a transparent member can be located near door 120 such that the user does not put his thumb or finger into direct contact with the transparent platen 140, but rather in contact with the transparent member, and the thumb or finger is scanned through the exposed portion of the transparent platen and through the transparent member.

If the match between the digitized image of the user identifier and a pattern stored in memory 172 is determined to be adequate, a user identification message can be displayed on display 162, acknowledging for example that the user has logged in and providing a greeting message. The message can also include a plurality of authorized functions that the user can select among, for example using buttons 164. Different messages would typically be provided for different identified users. If no adequate match is found between the digitized image of the user identifier and a pattern stored in memory 172, a message can be displayed on display 160 that user access is denied. Alternatively the display can provide a user profile identification message. Such a message could invite the user to scan a user identifier (a finger, a thumb or an identification card) and associate his name with the user identifier. The digitized image of the scanned user identifier can then be stored in nonvolatile memory 172 along with the user's name and other related information.

As indicated above, because there can be a visible outline at the border between door 120 and the white reflective region of scanner lid 110 or reflective backing plate 114, it can be useful to digitally correct scanned images to remove any artifacts. It has been found that for many items, including documents on sufficiently heavy paper (plain paper or special paper for photos), the visible outline of the door does not show up in the scanned image and no correction is needed. However for lighter weight papers or transparent objects, the outline of the door 120 can be detected by the photosensor array 152. In addition, for documents that do not cover the exposed portion 123 of transparent platen 140, the outline of door 120 can be detected by photosensor array 152 in the region beyond the document. Controller 170 can be provided with firmware for digital correction of the image to remove artifacts related to the border of door 120. For cases where the border of door 120 can be seen through the scanned item, the digital correction can include interpolation between pixels inside exposed portion 123 of transparent platen 140 and nearby pixels that are outside exposed portion 123, in order to remove door border image artifacts. For cases where the document or other scanned item does not cover over the exposed portion 123, the outline of the door 120 can be stored in memory 172 and digitally whited out or cropped out of the scanned image.

A variety of predetermined functions can be authorized when a particular user is identified by matching the image of the user identifier to a stored pattern in memory. For example, memory 172 can include an e-mail address account for a particular user. After the user has scanned an item to provide a digitized image of the item, the authorization step can authorize the e-mailing of the digitized image to an e-mail address in the e-mail address account. Alternatively, the authorized function can be to allow e-mailing of the digitized image to an e-mail address that the user enters on the display using a data entry device.

In some instances confidential information can be stored for a particular user and the authorization function can be the provision of the confidential information after the match between the user identifier and appropriate stored pattern in memory has been determined to be adequate.

In instances where the scanning apparatus 130 or multifunction printer 100 is connected to a host computer 171 or network computer 175 (such as a network server), it is not required that the steps of comparing the digitized image to a stored pattern and authorizing the function be done within the scanning apparatus 130 or multifunction printer 100. In such cases the comparison and authorization steps can be done in the host computer 171 or network computer 175. Some of the functions of memory 172 and controller 170 in such instances reside within the host computer 171 or network computer 175.

For a multifunction printer 100, additional functions for authorization can be included. For example, if the identified user has previously selected default settings of the multifunction printer for storage in memory 172 (such as a high quality print mode rather than a normal print mode) the user's document(s) can be printed with those default settings. Optionally, the default settings can be displayed on display 162 so that the user can first confirm whether he wants to use his usual default settings or modify the settings before operating the multifunction printer.

For multifunction printers connected to a network, further authorized functions can be provided. For example, memory 172 can include a list of network connection sites for a particular user. If it is determined that the digitized image of the user identifier adequately matches a stored pattern corresponding to the particular user, the list of network connection sites can be displayed on display 162. Further, the user can select a listed network connection site and content from the selected site can be displayed. Optionally the user can then choose to print content from the selected site using multifunction printer 100.

In some instances a network computer 175 that is connected to multifunction printer 100 includes a folder that is protected by a user name and password, and the step of authorizing a function includes allowing the identified user to access the folder. In other instances, the memory 172 includes a stored pattern of an administrator identifier, and the step of authorizing a function includes allowing the identified user (i.e. the administrator) to access privileged settings of the multifunction printer.

In some instances a user will want to print a confidential document on multifunction printer 100 from a network computer 175 that is not co-located with the multifunction printer. In such cases, printing of a secured print job from the network computer 175 can be delayed until the user logs into the multifunction printer by having his user identifier scanned and matched to his stored pattern in memory.

The invention has been described in detail with particular reference to certain preferred embodiments thereof, but it will be understood that variations and modifications can be effected within the spirit and scope of the invention.

PARTS LIST

10 Prior art multifunction printer
100 Multifunction printer
101 Multifunction printer with automatic document feeder
110 Scanner lid
111 Under side of automatic document feeder
112 Hinge
114 Reflective backing plate
115 Cutout
120 Door
121 Window
122 Access slot door
123 Portion (of transparent platen that is exposed)
124 Reference corner
130 Scanning apparatus
132 Scanning apparatus body
134 Scanning guide
135 Scanning direction
136 Frame
138 Offset (for reflective backing plate)
139 Offset for reflective backing strip 188
140 Transparent platen
142 Transparent platen region for automatic document feeder
150 Sensor array module
152 Photosensor array
154 Roller of sensor array module
156 Light source
160 Control panel
162 Display
164 Control buttons
170 Controller
171 Host computer
172 Memory
174 Power source
175 Network computer
176 Motor
177 Authorization module
180 Automatic document feeder
182 Input tray
184 Output tray
186 Document feed rollers 188 Reflective backing strip for automatic document feeder
190 Printing apparatus

The invention claimed is:

1. A scanning apparatus comprising:
   a transparent platen on which an item can be placed for scanning;
   a light source configured to emit light through the transparent platen to reflect off the item;
   a photosensor array that is movable to receive light reflected from successive portions of the item and convert the reflected light into electrical signals;
   a controller for providing digitized data from the electrical signals to form a digitized image of the item; and
   a lid including:
      a first position such that the lid covers the transparent platen;
      a second position such that the lid does not cover the transparent platen; and
      a door that is configured to expose a portion of the transparent platen when the lid is in the first position, wherein the exposed portion of the transparent platen is configured to be a size not larger than 2 square inches.

2. The scanning apparatus of claim 1, the transparent platen having a first area and the portion of the transparent platen exposed by the door having a second area, wherein the second area is less than three percent of the first area.

3. The scanning apparatus of claim 1, wherein the lid further includes a white reflective member configured to face the transparent platen, and wherein the door includes a white reflective portion configured to face the transparent platen.

4. The scanning apparatus of claim 3, wherein the white reflective portion of the door is substantially complementary in shape to the white reflective member of the lid.

5. The scanning apparatus of claim 1 further comprising a transparent member proximate the door in the lid, wherein when the door is opened, the portion of transparent platen is exposed through the transparent member.

6. The scanning apparatus of claim 1, the transparent platen including a reference corner located at a first end of the transparent platen, wherein the door is located near a second end of the transparent platen that is opposite the first end.

7. The scanning apparatus of claim 1, the lid further including an automatic document feeder configured to feed documents past a parked position of the scan assembly, wherein the parked position is located near a first end of the transparent platen, and wherein the door in the lid is located near a second end of the transparent platen that is opposite the first end.

8. The scanning apparatus of claim 1 further comprising a button to initiate a scan of the exposed portion of the transparent platen when the button is pushed.

9. The scanning apparatus of claim 1, wherein the scanning apparatus is connectable to a network.

10. A multifunction printer comprising:
    a printing apparatus for printing images on recording medium; and
    a scanning apparatus comprising:
       a transparent platen on which an item can be placed for scanning;
       a light source configured to emit light through the transparent platen to reflect off the item;
       a photosensor array that is movable to receive light reflected from successive portions of the item and convert the reflected light into electrical signals;
       a controller for providing digitized data from the electrical signals to form a digitized image of the item; and
       a lid including:
          a first position such that the lid covers the transparent platen;
          a second position such that the lid does not cover the transparent platen; and
          a door that is configured to expose a portion of the transparent platen when the lid is in the first position, wherein the exposed portion of the transparent platen is configured to be a size not larger than 2 square inches.

11. The multifunction printer of claim 10, the transparent platen having a first area and the portion of the transparent platen exposed by the door having a second area, wherein the second area is less than three percent of the first area.

12. The multifunction printer of claim 10, wherein the lid further includes a white reflective member configured to face the transparent platen, and wherein the door includes a white reflective portion configured to face the transparent platen.

13. The multifunction printer of claim 12, wherein the white reflective portion of the door is substantially complementary in shape to the white reflective member of the lid.

14. The multifunction printer of claim 10 further comprising a transparent member proximate the door in the lid, wherein when the door is opened, the portion of transparent platen is exposed through the transparent member.

15. The multifunction printer of claim 10 the transparent platen including a reference corner located at a first end of the transparent platen, wherein the door is located near a second end of the transparent platen that is opposite the first end.

16. The multifunction printer of claim 10, the lid further including an automatic document feeder configured to feed documents past a parked position of the scan assembly, wherein the parked position is located near a first end of the transparent platen, and wherein the door in the lid is located near a second end of the transparent platen that is opposite the first end.

17. The multifunction printer of claim 10 further comprising a button to initiate a scan of the exposed portion of the transparent platen when the button is pushed.

18. The multifunction printer of claim 17, wherein the button is virtual button on a software application.

19. The multifunction printer of claim 10, wherein the multifunction printer is connectable to a network.

20. The multifunction printer of claim 10 further comprising a control panel, wherein the control panel is detachable from the multifunction printer.

* * * * *